US011140031B2

(12) United States Patent
R et al.

(10) Patent No.: US 11,140,031 B2
(45) Date of Patent: Oct. 5, 2021

(54) INTENT AWARE CONTEXTUAL DEVICE CONFIGURATION BACKUP AND RESTORE

(71) Applicant: Juniper Networks, Inc., Sunnyvale, CA (US)

(72) Inventors: Jayanthi R, Coimbatore (IN); Rahamath Sharif, Bangalore (IN); Chandrasekhar A, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 3 days.

(21) Appl. No.: 16/523,786

(22) Filed: Jul. 26, 2019

(65) Prior Publication Data
US 2021/0028980 A1 Jan. 28, 2021

(51) Int. Cl.
*H04L 12/24* (2006.01)

(52) U.S. Cl.
CPC ...... *H04L 41/0816* (2013.01); *H04L 41/0695* (2013.01); *H04L 41/0836* (2013.01); *H04L 41/0843* (2013.01); *H04L 41/5009* (2013.01)

(58) Field of Classification Search
CPC ............ H04L 41/0816; H04L 41/0695; H04L 41/0836; H04L 41/0843; H04L 41/5009
USPC ........................................................ 709/221
See application file for complete search history.

(56) References Cited

U.S. PATENT DOCUMENTS

| 7,804,832 | B2 | 9/2010 | Andrews et al. | |
|---|---|---|---|---|
| 8,234,650 | B1 * | 7/2012 | Eppstein | H04L 41/5045 718/104 |
| 2005/0004942 | A1 * | 1/2005 | Madsen | H04L 41/0853 |
| 2015/0100671 | A1 * | 4/2015 | Song | H04L 41/12 709/221 |
| 2016/0246582 | A1 | 8/2016 | Benton | |
| 2020/0244525 | A1 * | 7/2020 | Chaganti | H04L 41/0873 |

FOREIGN PATENT DOCUMENTS

WO 2004090672 A2 10/2004

OTHER PUBLICATIONS

Harrington et al., "An Architecture for Describing Simple Network Management Protocol (SNMP) Management Frameworks," Network Working Group, RFC 3411, Dec. 2002, 64 pp.
Enns, "NETCONF Configuration Protocol," Network Working Group, RFC 4741, Dec. 2006, 95 pp.
(Continued)

*Primary Examiner* — Wing F Chan
*Assistant Examiner* — Leon Y Tseng
(74) *Attorney, Agent, or Firm* — Shumaker & Sieffert, P.A.

(57) ABSTRACT

An example controller device that manages a plurality of network devices includes one or more processing units implemented in circuitry and configured to: obtain device-level configuration information from a network device of the plurality of network devices at a first time; determine one or more out-of-band (OOB) configuration changes between the device-level configuration information from the network device and previous device-level intent configuration information compiled from one or more intents maintained by the controller device to manage the plurality of network devices; and store the one or more OOB configuration changes associated with the network device in incremental deltas.

18 Claims, 7 Drawing Sheets

(56) References Cited

OTHER PUBLICATIONS

Bjorklund, "YANG—A Data Modeling Language for the Network Configuration Protocol (NETCONF)," Internet Engineering Task Force (IETF), RFC 6020, Oct. 2010, 173 pp.
U.S. Appl. No. 15/198,657, by Juniper Networks, Inc., (Inventor: Jiang), filed Jun. 30, 2016.
U.S. Appl. No. 15/396,300, by Juniper Networks, Inc., (Inventors: Chandrasekhar et al.), filed Dec. 30, 2016.
"Recurrent Layers—Keras Documentation," Keras, accessed on Nov. 30, 2016, from https://keras.io/layers/recurrent/, 5 pp.
Sutskever, et al., "Sequence to Sequence Learning with Neural Networks," Proceeding NIPS'14 Proceedings of the 27th International Conference on Neural Information Processing Systems, Dec. 8-13, 2014; pp. 3104-3112.
U.S. Appl. No. 15/462,465, by Juniper Networks, Inc., (Inventors: Chandrasekhar et al.), filed Mar. 17, 2017.
U.S. Appl. No. 15/396,262, by Juniper Networks, Inc., (Inventors: Chandrasekhar et al.), filed Dec. 30, 2016.
Extended Search Report from counterpart European Application No. 19200393.7, dated Apr. 8, 2020, 9 pp.
Response to Extended Search Report dated Apr. 8, 2020 from counterpart European Application No. 19200393.7, filed Jul. 27, 2021, 31 pp.

\* cited by examiner

INTENT AWARE CONTEXTUAL DEVICE CONFIGURATION BACKUP AND RESTORE

TECHNICAL FIELD

The disclosure relates to computer networks, and more particularly, to management of network devices.

BACKGROUND

A computer network is a collection of interconnected computing devices that can exchange data and share resources. A variety of devices operate to facilitate communication between the computing devices. For example, a computer network may include routers, switches, gateways, firewalls, and a variety of other devices to provide and facilitate network communication.

These network devices typically include mechanisms, such as management interfaces, for locally or remotely configuring the devices. By interacting with the management interface, a client can perform configuration tasks as well as perform operational commands to collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may allow a user to view current operating parameters, system logs, information related to network connectivity, network activity or other status information from the devices as well as view and react to event information received from the devices.

Network configuration services may be performed by multiple distinct devices, such as routers with service cards and/or dedicated service devices. Such services include connectivity services such as Layer Three Virtual Private Network (L3VPN), Virtual Private Local Area Network Service (VPLS), and Peer to Peer (P2P) services. Other services include network configuration services, such as Dot1q VLAN Service. Network management systems (NMSs) and NMS devices, also referred to as controllers or controller devices, may support these services such that an administrator can easily create and manage these high-level network configuration services.

In particular, user configuration of devices may be referred to as "intents." An intent-based networking system lets administrators describe the intended network/compute/storage state. User intents can be categorized as business policies or stateless intents. Business policies, or stateful intents, may be resolved based on the current state of a network. Stateless intents may be fully declarative ways of describing an intended network/compute/storage state, without concern for a current network state.

Intents may be represented as intent data models, which may be modeled using unified graphs. Intent data models may be represented as connected graphs, so that business policies can be implemented across intent data models. For example, data models may be represented using connected graphs having vertices connected with has-edges and reference (ref) edges. Controller devices may model intent data models as unified graphs, so that the intend models can be represented as connected. In this manner, business policies can be implemented across intent data models. When Intents are modeled using a unified graph model, extending new intent support needs to extend the graph model and compilation logic.

In order to configure devices to perform the intents, a user (such as an administrator) may write translation programs that translate high-level configuration instructions (e.g., instructions according to an intent data model, which may be expressed as a unified graph model) to low-level configuration instructions (e.g., instructions according to a device configuration model). As part of configuration service support, the user/administrator may provide the intent data model and a mapping between the intent data model to a device configuration model.

In order to simplify the mapping definition for the user, controller devices may be designed to provide the capability to define the mappings in a simple way. For example, some controller devices provide the use of Velocity Templates and/or Extensible Stylesheet Language Transformations (XSLT). Such translators contain the translation or mapping logic from the intent data model to the low-level device configuration model. Typically, a relatively small number of changes in the intent data model impact a relatively large number of properties across device configurations. Different translators may be used when services are created, updated, and deleted from the intent data model.

SUMMARY

In general, this disclosure describes techniques for managing network devices. A network management system (NMS) device, also referred herein as a controller or controller device, may be configured to translate high-level configuration (intents received from an administrator for a plurality of managed network devices) to low-level configuration (to be applied to the managed network devices themselves). In some instances, the controller device may maintain backups of configurations (e.g., low-level configurations) based on intents, such that the controller device may restore a managed network device to a previous state (e.g., after the network enters a bad state). In some instances, new intents provided by an administrator to the controller device may create a conflict that may impact the functionality of one or more existing intents, which the controller device may detect before deploying the intent to one or more managed network devices—avoiding putting the network in a bad state. In some instances, however, an administrator may apply an out-of-band (OOB) configuration change directly to one of the managed network devices through direct interaction with the managed network device or through other third-party systems (e.g., without going through the controller device). This OOB configuration change may cause a breakage in the intent configuration (e.g., the low-level intent configuration translated from the intents), such that the controller device is not able to correctly restore and manage the network device from a backed-up intent configuration into a working state without requiting a user to manually reapply the OOB configuration changes. According to the techniques of this disclosure, the controller device may backup OOB configuration changes on a per-device basis (e.g., by periodically persisting a configuration delta between the intent configuration and the configuration of each managed network device) and restore a managed network device based on the intent configuration and the backed up OOB configuration changes (e.g., by merging the intent configuration and the backed up OOB configuration changes and pushing the merged configuration to the network device).

According to the techniques of this disclosure, the controller device may periodically determine a configuration delta between the locally stored configuration for the managed network devices and the configuration of each managed network device and persist incremental OOB configuration differences (or changes) between the periodic deltas. The disclosure also describes techniques to merge the intent configuration and the backed up OOB changes and to push the merged configuration to the network device. This enables the controller device to efficiently backup OOB configuration changes and properly restore a managed network device consistent with intents and OOB configuration changes without requiring an administrator to reconfigure the managed network device with the desired OOB configuration changes. Further, this disclosure describes techniques for comparing backed up OOB configurations.

In one example, a method includes obtaining, by a controller device that manages a plurality of network devices, device-level configuration information from a network device of the plurality of network devices at a first time; determining, by the controller device, one or more out-of-band (OOB) configuration changes between the device-level configuration information from the network device and previous device-level intent configuration information compiled from one or more intents maintained by the controller device to manage the plurality of network devices; and storing, by the controller device, the one or more OOB configuration changes associated with the network device.

In another example, computer-readable storage medium having stored thereon instructions that, when executed, cause a processor of a controller device that manages a plurality of network devices to obtain device-level configuration information from a network device of the plurality of network devices at a first time; determine one or more out-of-band (OOB) configuration changes between the device-level configuration information from the network device and previous device-level intent configuration information compiled from one or more intents maintained by the controller device to manage the plurality of network devices; and store the one or more OOB configuration changes associated with the network device.

In another example, controller device that manages a plurality of network devices includes one or more processing units implemented in circuitry and configured to obtain device-level configuration information from a network device of the plurality of network devices at a first time; determine one or more out-of-band (OOB) configuration changes between the device-level configuration information from the network device and previous device-level intent configuration information compiled from one or more intents maintained by the controller device to manage the plurality of network devices; and store the one or more OOB configuration changes associated with the network device.

The details of one or more examples are set forth in the accompanying drawings and the description below. Other features, objects, and advantages will be apparent from the description and drawings, and from the claims.

DETAILED DESCRIPTION

Figure 1:
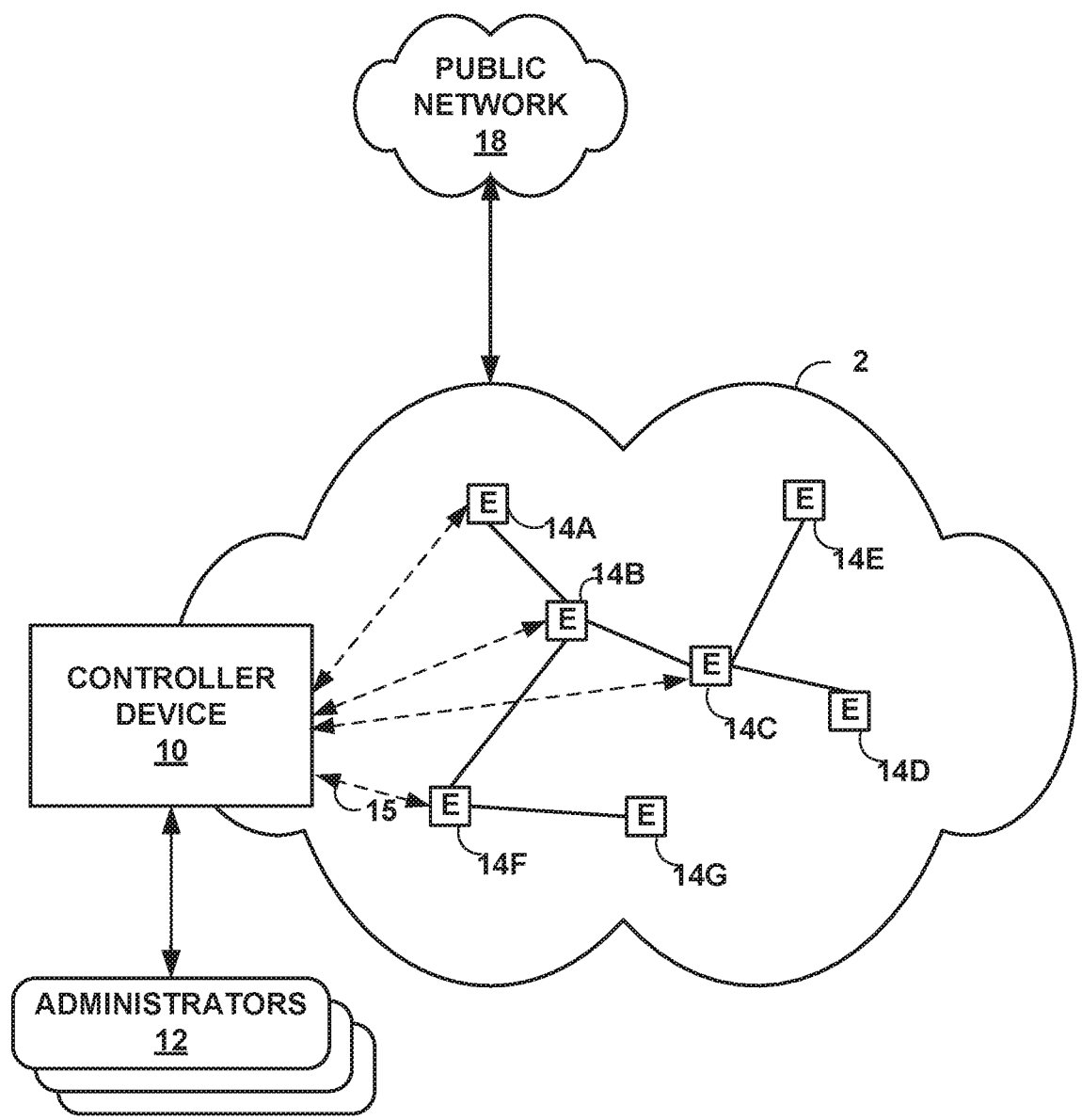
FIG. 1 is a block diagram illustrating an example including elements of an enterprise network that are managed using a management device.

FIG. 1 is a block diagram illustrating an example including elements of an enterprise network 2 that are managed using a controller device 10. Managed elements 14A-14G (collectively, "elements 14") of enterprise network 2 include network devices interconnected via communication links to form a communication topology in order to exchange resources and information. Elements 14 (also generally referred to as network devices or remote network devices) may include, for example, routers, switches, gateways, bridges, hubs, servers, firewalls or other intrusion detection systems (IDS) or intrusion prevention systems (IDP), computing devices, computing terminals, printers, other network devices, or a combination of such devices. While described in this disclosure as transmitting, conveying, or otherwise supporting packets, enterprise network 2 may transmit data according to any other discrete data unit defined by any other protocol, such as a cell defined by the Asynchronous Transfer Mode (ATM) protocol, or a datagram defined by the User Datagram Protocol (UDP). Communication links interconnecting elements 14 may be physical links (e.g., optical, copper, and the like), wireless, or any combination thereof.

Enterprise network 2 is shown coupled to public network 18 (e.g., the Internet) via a communication link, Public network 18 may include, for example, one or more client computing devices. Public network 18 may provide access to web servers, application servers, public databases, media servers, end-user devices, and other types of network resource devices and content.

Controller device 10 is communicatively coupled to elements 14 via enterprise network 2. Controller device 10, in some examples, forms part of a device management system, although only one device of the device management system is illustrated for purpose of example in FIG. 1. Controller device 10 may be coupled either directly or indirectly to the various elements 14. Once elements 14 are deployed and activated, administrator 12 uses controller device 10 to manage the network devices using a device management protocol. One example device protocol is the Simple Network Management Protocol (SNMP) that allows controller device 10 to traverse and modify management information bases (MIBs) that store configuration data within each of managed elements 14. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference.

In common practice, controller device 10, also referred to as a network management system (NMS) or NMS device, and elements 14 are centrally maintained by an IT group of the enterprise. Administrator 12 interacts with controller device 10 to remotely monitor and configure elements 14. For example, administrator 12 may receive alerts from controller device 10 regarding any of elements 14, view configuration data of elements 14, modify the configurations data of elements 14, add new network devices to enterprise network 2, remove existing network devices from enterprise network 2, or otherwise manipulate the enterprise network 2 and network devices therein. Although described with respect to an enterprise network, the techniques of this disclosure are applicable to other network types, public and private, including LANs, VLANs, VPNs, and the like.

In some examples, administrator 12 uses controller device 10 or a local workstation to interact directly with elements 14, e.g., through telnet, secure shell (SSH), or other such communication sessions. That is, elements 14 generally provide interfaces for direct interaction, such as command line interfaces (CLIs), web-based interfaces, graphical user interfaces (GUIs), or the like, by which a user can interact with the devices to directly issue text-based commands. For example, these interfaces typically allow a user to interact directly with the device, e.g., through a telnet, secure shell (SSH), hypertext transfer protocol (HTTP), or other network session, to enter text in accordance with a defined syntax to submit commands to the managed element. In some examples, the user initiates an SSH session 15 with one of elements 14, e.g., element 14F, using controller device 10, to directly configure element 14F. In this manner, a user can provide commands in a format for execution directly to elements 14.

Further, administrator 12 can also create scripts that can be submitted by controller device 10 to any or all of elements 14. For example, in addition to a CLI interface, elements 14 also provide interfaces for receiving scripts that specify the commands in accordance with a scripting language. In a sense, the scripts may be output by controller device 10 to automatically invoke corresponding remote procedure calls (RPCs) on the managed elements 14. The scripts may conform to, e.g., extensible markup language (XML) or another data description language.

Administrator 12 uses controller device 10 to configure elements 14 to specify certain operational characteristics that further the objectives of administrator 12. For example, administrator 12 may specify for an element 14 a particular operational policy regarding security, device accessibility, traffic engineering, quality of service (QoS), network address translation (NAT), packet filtering, packet forwarding, rate limiting, or other policies. Controller device 10 uses one or more network management protocols designed for management of configuration data within managed network elements 14, such as the SNMP protocol or the Network Configuration Protocol (NETCONF) protocol or a derivative thereof, such as the Juniper Device Management Interface, to perform the configuration. In general, NETCONF provides mechanisms for configuring network devices and uses an Extensible Markup Language (XML)-based data encoding for configuration data, which may include policy data. NETCONF is described in Enns, "NETCONF Configuration Protocol," Network Working Group, RFC 4741, December 2006, available at tools.ietf.org/html/rfc4741, the entire contents of which are incorporated herein by reference. Controller device 10 may establish NETCONF sessions with one or more of elements 14.

Controller device 10 may be configured to accept high-level configuration data, or intents, from administrator 12 (which may be expressed as structured input parameters, e.g., according to YANG, which is described in Bjorklund, "YANG—A Data Modeling Language for the Network Configuration Protocol (NETCONF)," Internet Engineering Task Force, RFC 6020, October 2010, available at tools.ietf.org/html/rfc6020). Controller device 10 may also be configured to output respective sets of low-level device configuration data, e.g., device configuration additions, modifications, and removals. Additional details regarding an example process for translating high level configuration information to low-level device configuration information can be found in, e.g., Jiang et al., "TRANSLATING HIGH-LEVEL CONFIGURATION INSTRUCTIONS TO LOW-LEVEL DEVICE CONFIGURATION," U.S. patent application Ser. No. 15/198,657, filed Jun. 30, 2016, the entire contents of which are hereby incorporated by reference. This disclosure refers to low-level device configuration produced from intents (i.e., produced by compiling or translating the intents) as "device-level intent configuration information" or "intent configuration," to distinguish this device-level configuration from out of band (OOB) device-level configuration. In some examples, controller device 10 may use YANG modeling for an intent data model and low-level device configuration models. This data may contain relations across YANG entities, such as list items and containers. In some examples, controller device 10 may convert a YANG data model into a database model, and convert YANG validations into data validations. Techniques for managing network devices using a graph model for high level configuration data is described in "CONFIGURING AND MANAGING NETWORK DEVICES USING PROGRAM OVERLAY ON YANG-BASED GRAPH DATABASE," U.S. patent application Ser. No. 15/462,465, filed Mar. 17, 2017, the entire contents of which are hereby incorporated by reference.

Controller device 10 may receive data from one of administrators 12 representing any or all of create, update, and/or delete actions with respect to the intent data model. Controller device 10 may be configured to use the same compilation logic for each of create, update, and delete as applied to the graph model.

In general, controllers like controller device 10 use a hierarchical data model for intents, low-level data models, and resources. The hierarchical data model can be based on YANG or YAML. The hierarchical data model can be represented as a graph, as discussed above. Modern systems have supported intents to ease the management of networks. Intents are declarative. To realize intents, controller device 10 attempts to select optimal resources.

In general, customer environments are configured to allow customers (e.g., administrators 12) to control intent realization and assure programmed intents through controller device 10. Controller device 10 may maintain backups of device-level configuration information for elements 14 based on intents, such that controller device 10 may restore any of elements 14 to a previous state (e.g., after the network or device enters a bad state). For example, new intents provided by administrator 12 to controller device 10 may impact the functionality of one or more existing intents for one or more elements 14—putting the network in a bad state. To restore the network into a good state, controller device 10 may restore one or more elements 14 using backed-up intent configuration information. In some instances, however, administrator 12 may apply an out-of-band (OOB) change directly to one of elements 14 through direct interaction with the managed network device or through other third-party systems (e.g., without going through the controller device. This OOB configuration change may cause a breakage in the intent configuration (e.g., the low-level intent configuration translated from the intents), such that the controller device is not able to correctly restore elements 14 from backed-up intent configuration information into a working state based on intents without requiring an administrator 12 to manually reapply any OOB changes, which can be difficult and/or tedious to do.

OOB changes may include two kinds of changes, e.g., through a command line interface (CLI) or other applications of elements 14, that can bring a service "out of synch" to the network generally. For example, a modification to service parameters through the CLI may be an OOB change. For another example, expanding a service with more objects may be an OOB change (e.g., adding a new interface to a peer-to-peer (P2P) service).

Elements 14 may provide a CLI by which administrators 12 may provide OOB configuration updates directly to elements 14. A service performed by one or more of elements 14 may have been configured with certain values for properties. These properties can be modified through the CLI. This renders these service properties (or attributes) to be out of synch with the configuration information stored by controller device 10. For example, suppose there were a P2P service with three UNIs interfaces configured with bandwidth of "500." A user (e.g., one of administrators 12), through the CLI, could modify the Bandwidth for one interface alone, rendering that particular element 14 out of synch with any device level configuration information maintained by controller device 10 for that particular element 14.

Controller device 10 may be configured to periodically compare device-level configuration information from each of elements 14 and previous device-level intent configuration information compiled (or translated) from one or more intents maintained by the controller device to manage the plurality of network devices, determine one or more OOB configuration changes between the device-level configuration information and the previous device-level intent configuration, and store (e.g., backup in configuration database 40) the one or more OOB configuration changes associated with the network device. In particular, controller device 10 determines whether the current device-level configuration information from a particular network device includes any additional configuration parameters relative to the previous device-level intent configuration information compiled (or translated) from one or more intents for that network device, as well as whether the current device-level configuration information modifies or omits any configuration parameters that were included in the previous device-level intent configuration information compiled (or translated) from one or more intents, and stores (e.g., in configuration database 40) those additional, modified, or omitted configuration parameters. In this way, controller device 10 can restore any of elements 14, including any OOB changes, by merging the previous device-level intent configuration information and the backed up OOB changes and configuring the one or more elements 14 with the merged configuration information when an element 14 or the network enters a bad state, as described in further detail below.

In one or more aspects, controller 10 backs up incremental OOB configuration differences (e.g., changes) over time. In particular, controller 10 may determine first one or more OOB configuration changes between the current device-level configuration information from a network device and the previous device-level intent configuration compiled (or translated) from one or more intents for that network device at a first time and store (e.g., in configuration database 40) those one or more OOB configuration changes associated with a network device. Controller 10 may then determine second one or more OOB configuration changes between the current device-level configuration information from a network device and the previous device-level intent configuration compiled (or translated) from one or more intents for that network device at a second time and store (e.g., in configuration database 40) the incremental OOB configuration differences between the first one or more OOB configuration changes determined at the first time and the second one or more OOB configuration changes determined at a second time. Next, controller may determine third one or more OOB configuration changes at a third time and store (e.g., in configuration database 40) the incremental OOB configuration differences between the second one or more OOB configuration changes determined at a second time and the third one or more OOB configuration changes determined at the third time, and so on. In this way, controller 10 can backup OOB configuration changes efficiently and conserve storage space (particularly when the OOB configuration changes are minimal).

Figure 2:
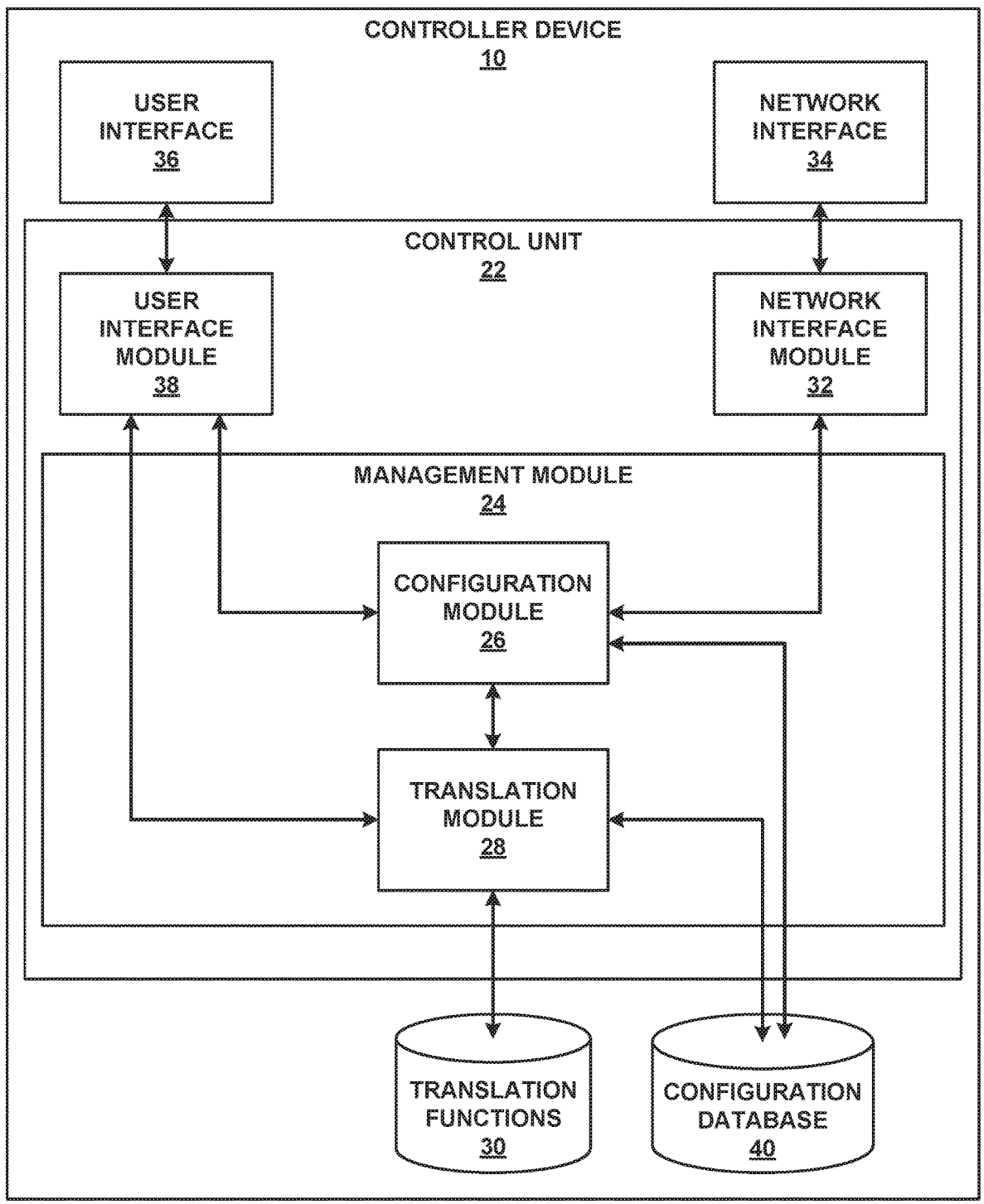
FIG. 2 is a block diagram illustrating an example set of components for the management device of FIG. 1.

FIG. 2 is a block diagram illustrating an example set of components for controller device 10 of FIG. 1. In this example, controller device 10 includes control unit 22, network interface 34, and user interface 36. Network interface 34 represents an example interface that can communicatively couple controller device 10 to an external device, e.g., one of elements 14 of FIG. 1. Network interface 34 may represent a wireless and/or wired interface, e.g., an Ethernet interface or a wireless radio configured to communicate according to a wireless standard, such as one or more of the IEEE 802.11 wireless networking protocols (such as 802.11 a/b/g/n or other such wireless protocols). Controller device 10 may include multiple network interfaces in various examples, although only one network interface is illustrated for purposes of example.

Control unit 22 represents any combination of hardware, software, and/or firmware for implementing the functionality attributed to control unit 22 and its constituent modules and elements. When control unit 22 includes software or firmware, control unit 22 further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), or any other equivalent integrated or discrete logic circuitry, as well as any combinations of such components. Furthermore, a processing unit is generally implemented using fixed and/or programmable logic circuitry.

User interface 36 represents one or more interfaces by which a user, such as administrator 12 (FIG. 1) interacts with controller device 10, e.g., to provide input and receive output. For example, user interface 36 may represent one or more of a monitor, keyboard, mouse, touchscreen, touchpad, trackpad, speakers, camera, microphone, or the like. Furthermore, although in this example controller device 10 includes a user interface, it should be understood that administrator 12 need not directly interact with controller device 10, but instead may access controller device 10 remotely, e.g., via network interface 34.

In this example, control unit 22 includes user interface module 38, network interface module 32, and management module 24. Control unit 22 executes user interface module 38 to receive input from and/or provide output to user interface 36. Control unit 22 also executes network interface module 32 to send and receive data (e.g., packets) via network interface 34. User interface module 38, network interface module 32, and management module 24 may again be implemented as respective hardware units, or in software or firmware, or a combination thereof.

Control unit 22 executes management module 24 to manage various network devices, e.g., elements 14 of FIG. 1. Management includes, for example, configuring the network devices according to instructions received from a user (e.g., administrator 12 of FIG. 1) and providing the user with the ability to submit instructions to configure the network devices. In this example, management module 24 further includes configuration module 26 and translation module 28.

Management module 24 is configured to receive intents (e.g., high-level configuration instructions) for a set of managed network devices from a user, such as administrator 12. Over time, the user may update the configuration instructions, e.g., to add new services, remove existing services, or modify existing services performed by the managed devices. The intents may be structured according to, e.g., YANG. In some examples, management module 24 also provides the user with the ability to submit translation functions that translation module 28 executes to transform intents to device-specific, low-level configuration instructions, as discussed below.

Controller device 10 also includes configuration database 40. Configuration database 40 generally includes information describing managed network devices, e.g., elements 14. For example, configuration database 40 may include information indicating device identifiers (such as MAC and/or IP addresses), device type, device vendor, devices species (e.g., router, switch, bridge, hub, etc.), or the like. Configuration database 40 also stores device-level configuration information based on intents (e.g., high-level configuration information, or in some cases, both high-level configuration and low-level configuration information) for the managed devices (e.g., elements 14). In one or more aspects, configuration database 40 also stores backups of OOB configuration changes for each of the managed devices (e.g., elements 14) in configuration database 40. In one or more aspects, configuration database 40 stores device-level configuration information based on intents in different data sets than the backups of the OOB configuration changes for each of the managed devices (e.g., elements 14). In one or more aspects, a separate OOB database (not shown) stores the backups of the OOB configuration changes for each of the managed devices (e.g., elements 14).

Translation module 28 determines which devices are managed using configuration database 40. Translation module 28 determines which of translation functions 30 to execute on the high-level configuration instructions based on the information of configuration database 40, which of the devices are to receive the low-level configuration instructions. Translation module 28 then executes each of the determined translation functions of translation functions 30, providing the high-level configuration instructions to the translation functions as input and receiving low-level configuration instructions. Translation module 28 may then provide the low-level configuration instructions to configuration module 26.

After receiving the low-level configuration instructions from translation module 28, configuration module 26 sends the low-level configuration instructions to respective managed network devices for which configuration is to be updated via network interface module 32. Network interface module 32 passes the low-level configuration instructions to network interface 34. Network interface 34 forwards the low-level configuration instructions to the respective network devices.

Although user interface 36 is described for purposes of example as allowing administrator 12 (FIG. 1) to interact with controller device 10, it should be understood that other interfaces may be used in other examples. For example, controller device 10 may include a representational state transfer (REST) client (not shown) that may act as an interface to another device, by which administrator 12 may configure controller device 10. Likewise, administrator 12 may configure elements 14 by interacting with controller device 10 through the REST client.

Figure 3:
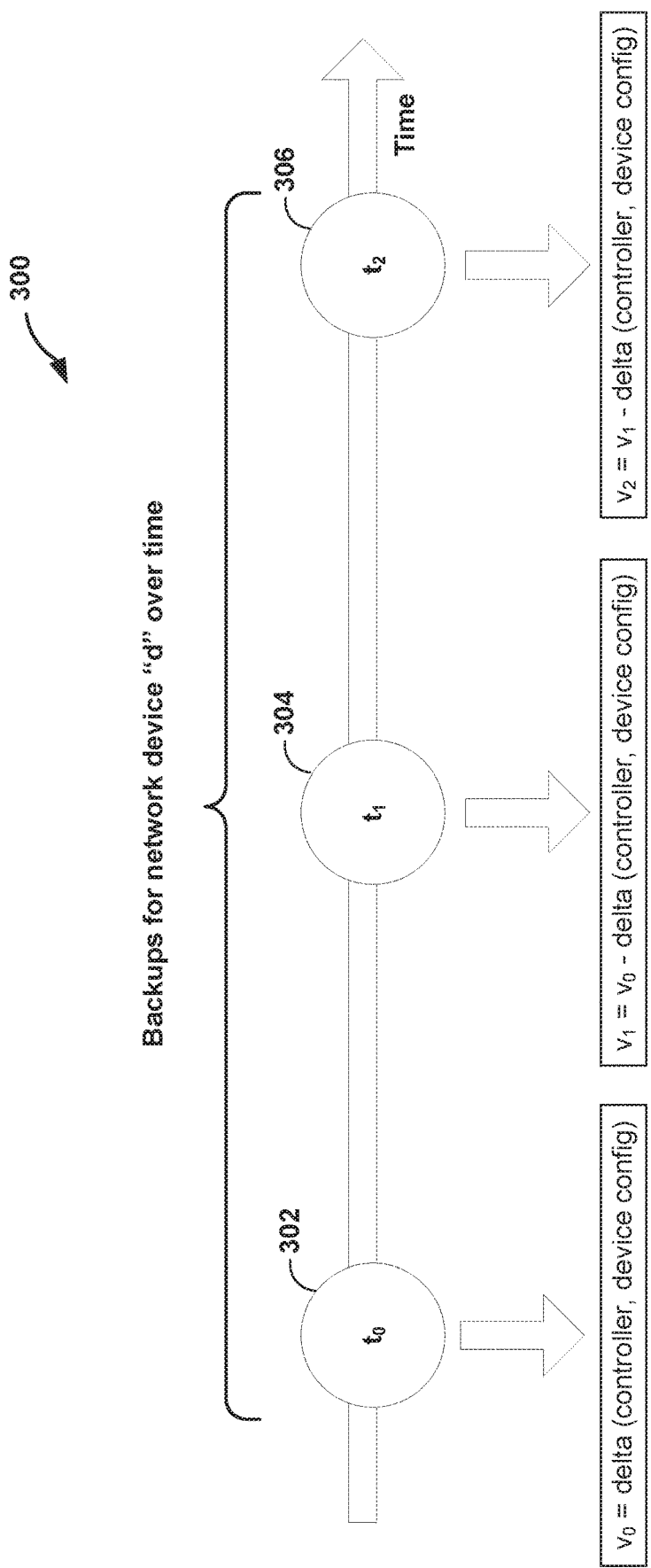
FIG. 3 is a timeline illustrating example incremental backups of OOB configuration changes in accordance with the techniques of this disclosure.

FIG. 3 is a timeline 300 illustrating example incremental backups of OOB configuration changes in accordance with the techniques of this disclosure. In particular, backup 302 at time $t_0$ (e.g., a first time) may comprise the delta (e.g., difference) $v_0$ between the device-level intent configuration information translated from one or more intents maintained by the controller device to manage a plurality of network devices ("controller" in the expression for $v_0$ in FIG. 3) and the current device-level configuration information from a network device at time $t_0$ containing one or more OOB configuration changes ("device config" in the expression for $v_0$ in FIG. 3). As described above, an OOB configuration change may be a configuration change made to a network device without going through the controller device (e.g., controller device 10 of FIG. 1). This OOB configuration change would thus not be reflected in the device-level intent configuration information translated from one or more intents maintained by the controller device—rendering the device-level intent configuration information translated from one or more intents maintained by the controller device out of synch with the actual device-level configuration of the network device. This disclosure refers to low-level device configuration produced from intents (i.e., produced by compiling or translating the intents) as "device-level intent configuration information" or "intent configuration," to distinguish this device-level configuration from OOB device-level configuration.

Backup 304 at time $t_1$ (e.g., a second time) comprises the delta $v_1$ (e.g., the incremental difference) between delta $v_0$ of the one or more incremental OOB configuration changes to the network device at time $t_0$ (e.g., a first time) and the one or more OOB configuration changes to the network device at time $t_1$ (e.g., a second time) which may comprise the delta (or difference) between the device-level intent configuration information translated from one or more intents maintained by the controller device ("controller" in the expression for $v_1$ in FIG. 3) and the current device-level configuration information from the network device at time $t_1$ containing one or more OOB configuration changes ("device config" in the expression for $v_1$ in FIG. 3).

Similarly, backup 306 at time $t_2$ (e.g., a third time) comprises the delta $v_2$ (e.g., the incremental difference) between delta $v_1$ of the one or more incremental OOB configuration changes to the network device at time $t_1$ (e.g., a second time) and the one or more OOB configuration changes to the network device at time $t_2$ (e.g., a third time) which may comprise the delta (or difference) between the device-level intent configuration information translated from one or more intents maintained by the controller device ("controller" in the expression for $v_2$ in FIG. 3) and the current device-level configuration information from the network device at time $t_2$ containing one or more OOB configuration changes ("device config" in the expression for $v_2$ in FIG. 3). In one or more aspects, the duration of time between each of time $t_0$, $t_1$, and $t_2$ may be the same (or substantially the same) (e.g., 30 seconds, 5 minutes, 30 minutes, 2 hours, or any other interval of time). In one or more aspects, the device-level intent configuration information translated from one or more intents maintained by the controller device ("controller" in the expressions in FIG. 3) is the same at time $t_1$, $t_2$, and/or $t_3$. In one or more aspects, each of backups 302, 304, and 306 can be stored (e.g., by controller 10 of FIG. 1) in a database (e.g., configuration database 40 in FIG. 2) as an XML file (e.g., an Extensible Markup Language Document Object Model (XML DOM)), a graph data model, in a log file, or any other format.

By backing up the incremental differences in OOB configuration changes (e.g., deltas $v_0$, $v_1$, and $v_2$ in FIG. 3), a controller device in accordance with aspects of this disclosure conserves storage space with every backup. For example, instead of backing up the difference between the device-level intent configuration information translated from one or more intents maintained by the controller device and the current device-level configuration information from a network device (e.g., "delta (controller, device config)" in the expressions in FIG. 3) at times $t_0$, $t_1$, and $t_2$, the controller device avoids backing up redundant OOB configuration changes. This may enable the controller device to store more OOB configuration information over time (e.g., backup OOB configuration information for more network devices and/or backup OOB configuration information at closer intervals of time).

An example delta (e.g., difference) $v_0$ between the device-level intent configuration information translated from one or more intents maintained by the controller device to manage a plurality of network devices ("controller" in the expression for $v_0$ in FIG. 3) and the device-level configuration information from a network device at time to containing one or more OOB configuration changes ("device config" in the expression for $v_0$ in FIG. 3) is shown below:

```
'v_0' = {
    "interfaces": {
        "interface": {
            "name": "ge-0/0/1",
            "operation": "create"
        }
    }
}
```

In the example above, a network interface named "ge-0/0/1" was created out-of-band (e.g., through a command line interface (CLI) or other applications outside of the controller device) for a particular network device at some point before time $t_0$. In one or more aspects, the above OOB configuration change $v_0$ is stored in an XML DOM (e.g., by controller device 10 in configuration database 40). In one or more aspects, the above OOB configuration change $v_0$ is stored separate from the device-level intent configuration information translated from one or more intents maintained by the controller device. An example delta $v_1$ (e.g., an incremental OOB configuration difference) between delta $v_0$ in the example above and the one or more OOB configuration changes to the network device at time $t_1$ (e.g., a second time) is shown below:

```
'v_1' = {
    "interfaces": {
        "interface": {
            "name": "ge-0/0/1",
            "operation": "delete"
        }
        "interface": {
            "name": "ge-0/0/2",
            "operation": "create"
        }
    }
}
```

In the example above, the interface "ge-0/0/1" is removed and a new interface "ge-0/0/2" is created out-of-band for the particular network device at some point in time between time $t_0$ and $t_1$. In one or more aspects, the incremental OOB configuration difference $v_1$ is stored in an XML DOM (e.g., by controller device 10 in configuration database 40). In one or more aspects, the above OOB configuration change $v_1$ is stored separate from the device-level intent configuration information translated from one or more intents maintained by the controller device 10. An example delta $v_2$ (e.g., an incremental OOB configuration difference) between delta $v_1$ in the example above and the one or more OOB configuration changes to the network device at time $t_2$ (e.g., a third time) is shown below:

```
'v_2' = {
    "interfaces": {
        "interface": {
            "name": "ge-0/0/2",
            "operation": "update"
        }
    }
}
```

In the example above, the interface "ge-0/0/2" is updated out-of-band for the particular network device at some point in time between time $t_1$ and $t_2$. In one or more aspects, the incremental OOB configuration difference $v_2$ is stored in an XML DOM (e.g., by controller device 10 in configuration database 40). In one or more aspects, the above OOB configuration change $v_2$ is stored separate from the device-level intent configuration information translated from one or more intents maintained by the controller device.

In some examples, backed up incremental OOB configuration changes can be be compared in accordance with the techniques of this disclosure. For example, to calculate the difference between a first backed up configuration (e.g., '$v_a$') and a second backed up configuration ('$v_n$'), a system in accordance with this disclosure may simply merge the backed up deltas after the first backed up configuration to the second configuration (e.g., merge '$v_{a+1}$' through '$v_n$'). In this way, the overall time taken to calculate the difference between backups may be reduced.

Figure 4:
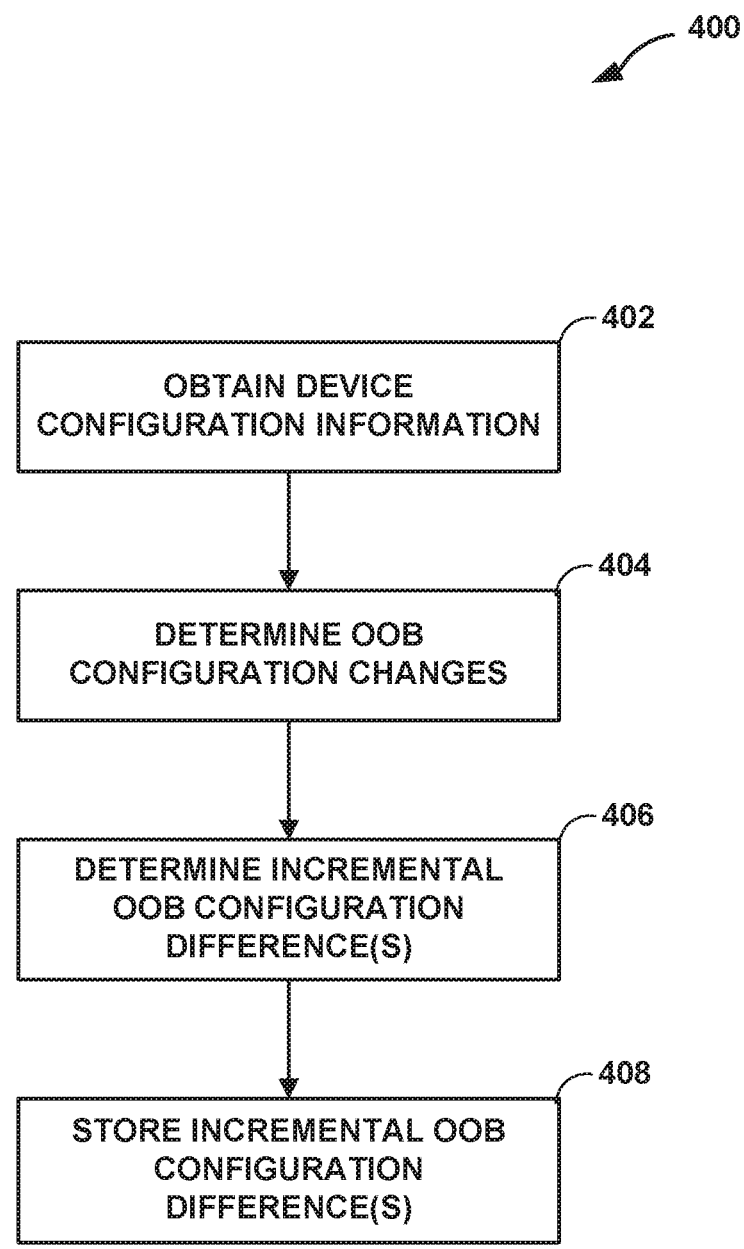
FIG. 4 is a flowchart illustrating an example method for backing up OOB configuration changes according to techniques of this disclosure.

FIG. 4 is a flowchart illustrating an example method 400 for backing up OOB configuration changes according to techniques of this disclosure. Method 400 of FIG. 4 may be performed by, e.g., controller device 10 of FIGS. 1 and 2. In one or more aspects, method 400 may be performed periodically (e.g., at predetermined intervals of time as shown in FIG. 3), every time device-level intent configurations are translated from one or more intents and pushed to at least one network device, and/or every time an OOB configuration change is made to a network device. As noted above, this disclosure refers to low-level device configuration produced from intents (i.e., produced by compiling or translating the intents) as "device-level intent configuration information" or "intent configuration," to distinguish this device-level configuration from OOB device-level configuration.

Initially, controller device 10 obtains device-level configuration information from a network device (402), which may include any previous device-level intent configuration information translated from one or more intents entered by a user (e.g., an administrator 12) through controller device 10 and any OOB configuration changes subsequently made by a user (e.g., an administrator 12) without going through controller device 10. Next, controller device 10 may determine the OOB configuration changes included in the obtained device-level configuration information from the network device (404). In one or more aspects, controller device 10 may determine the OOB configuration changes made to the network device by determining the configuration differences (e.g., the delta) between the previous device-level intent configuration information translated from one or more intents (maintained by controller device 10) and the device-level configuration information (obtained from the network device) (e.g., the expression "delta (controller, device config)" in FIG. 3). These configuration differences may represent the the OOB configuration changes made to the network device without going through the controller device 10. Delta "$v_0$" described above is an example of configuration differences (e.g., the delta) between the previous device-level intent configuration information translated from one or more intents (maintained by controller device 10) and the device-level configuration information (obtained from the network device), which shows that interface "ge-0/0/1" was created OOB by a user.

Controller device 10 may then determine the incremental OOB configuration differences (e.g., changes) between the determined OOB configuration changes and the previously determined OOB configuration changes (e.g., other backed-up OOB configuration changes). In one or more aspects, controller device 10 may determine the incremental OOB configuration differences by comparing the determined OOB configuration changes to the previously backed up OOB configuration changes and identifying any OOB configuration changes that are not already reflected in the previously backed up OOB configuration changes. Controller device 10 may then store the incremental OOB configuration differences (408). In one or more aspects, the incremental OOB configuration differences may be stored (e.g., by controller 10) in a database (e.g., configuration database 40 in FIG. 2) as an XML file (e.g., an XML DOM), a graph data model, in a log file, or any other format. Delta "$v_1$" and delta "$v_2$" described above are examples of incremental OOB configuration differences. For example, comparing delta "$v_2$" to delta "$v_1$" shows that delta "$v_2$" does not include the creation of interface "ge-0/0/2" because that operation was already included in delta "$v_1$". Similarly, "$v_2$" does not include the creation and deletion of interface "ge-0/0/1" because those operations were already included in delta "$v_0$" and delta "$v_1$" respectively. By storing the incremental OOB configuration differences in this manner, controller device 10 conserves storage space.

Figure 5:
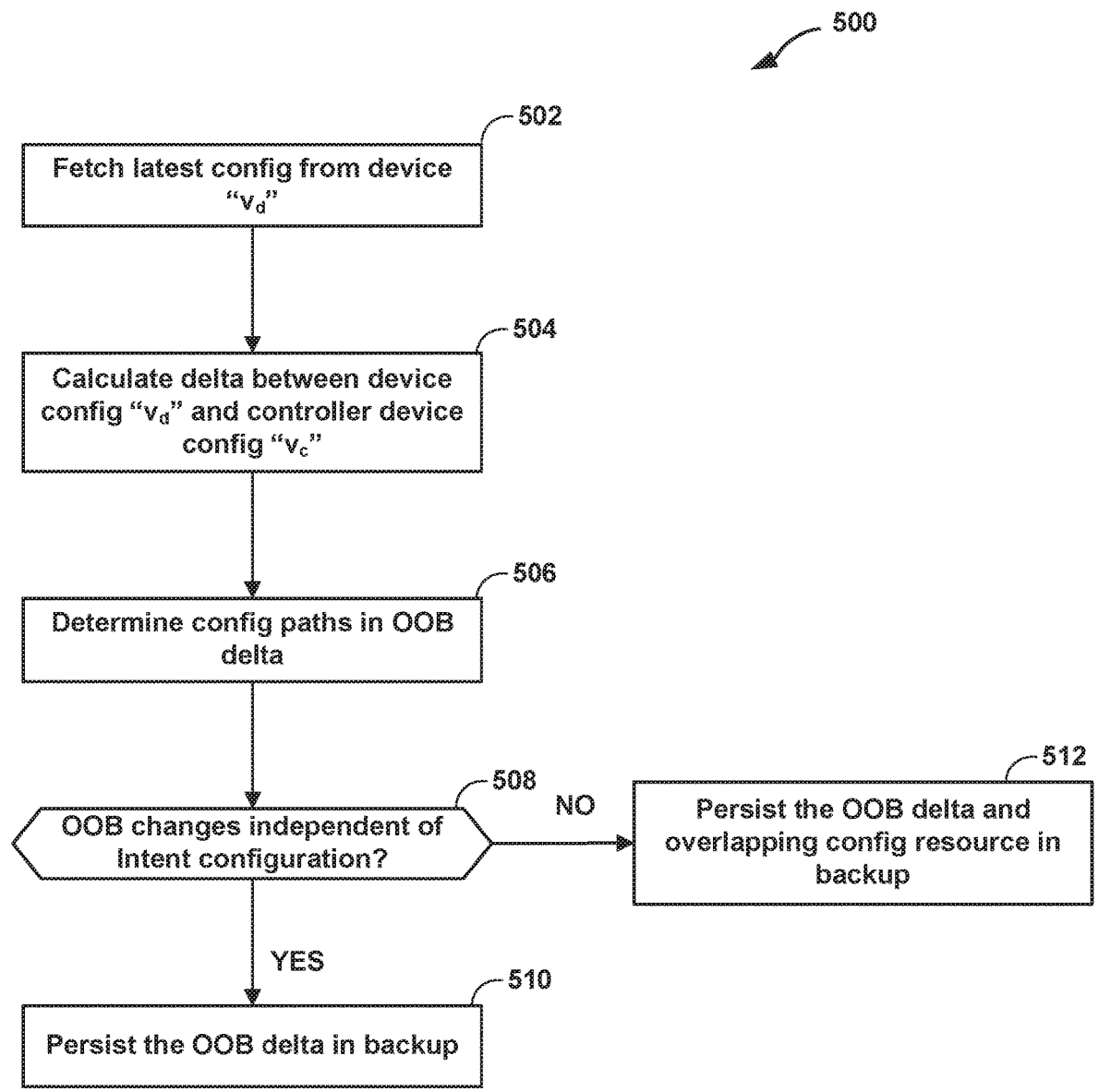
FIG. 5 is a flowchart illustrating another example method for backing up OOB configuration changes according to techniques of this disclosure.

FIG. 5 is a flowchart illustrating another example method 500 for backing up OOB configuration changes according to techniques of this disclosure. Method 500 of FIG. 5 may be performed by, e.g., controller device 10 of FIGS. 1 and 2.

Initially, when a backup is triggered for a network device (e.g., after a predetermined amount of time or after an OOB configuration change is made), controller 10 fetches the latest (e.g., the current) device-level configuration information from the network device (502) (e.g., "$V_d$" where "d" denotes device configuration version). Next, controller 10 may calculate the delta between the controller configuration version and the device configuration version (e.g., $V_c$-$V_d$) (504). For example, controller 10 may compare the latest device-level configuration information from the network device ($V_d$) to the latest device-level intent configuration information in the controller for the network device (e.g., "Vc" where "c" denotes controller configuration version) to calculate the delta between the device version $V_d$ and the controller configuration version $V_c$ for the network device ($V_c$-$V_d$)), which represents the OOB delta (e.g., the OOB configuration changes made to the network device). In one or more aspects, the controller configuration version Vc comprises device-level intent configuration information translated from one or more intents and maintained by controller device 10. Controller device 10 may then determine the configuration paths in the OOB delta (506). For example, controller device 10 may walk through the graph representation of the OOB delta (e.g., the XML DOM) for each of the nodes or elements in the graph representation and determine whether any paths in the OOB delta correspond to nodes or elements in the controller configuration version $V_c$ graph representation. Controller device 10 may then determine whether the OOB changes are independent of Intent configurations (e.g., the device-level intent configuration information translated from one or more intents and maintained by controller device 10) (508). For example, controller device 10 may determine, based on its walk through of the graph representation of the OOB delta (e.g., the XML DOM) for each of the nodes, that the OOB changes are not independent of the Intent configurations if paths in the OOB delta correspond to nodes or elements in the controller configuration version $V_c$ graph representation, which indicates that there is an OOB configuration change associated with that node or element in the controller configuration version $V_c$. Conversely, controller may determine, based on its walk through of the graph representation of the OOB delta (e.g., the XML DOM) for each of the nodes, that the OOB changes are independent of the Intent configurations if paths in the OOB delta do not correspond to nodes or elements in the controller configuration version $V_c$ graph representation, which indicates that the OOB configuration changes are not associated with any node or element in the controller configuration version $V_c$. If the OOB changes are independent of the Intent configuration ("YES" branch of 508), controller device 10 will persist (e.g., store or backup) the OOB delta (510). If the OOB changes are not independent of the Intent configuration because there are one or more configuration resources that overlap between the device configuration version $V_d$ and the controller configuration version $V_c$ ("NO" branch of 508), controller device will persist (e.g., store or backup) the OOB delta and the one or more overlapping configuration resource (including metadata information of the one or more overlapping configuration resource) (512). In one or more aspects, an overlapping configuration resource is a resource that is used by both the device configuration version $V_d$ and the controller configuration version $V_c$. In one or more aspects, an overlapping configuration resource may be the same between the device configuration version $V_d$ and the controller configuration version $V_c$. In one or more aspects, an overlapping configuration resource may not be identical (e.g., is altered in some way) between the device configuration version $V_d$ and the controller configuration version $V_c$.

Figure 6:
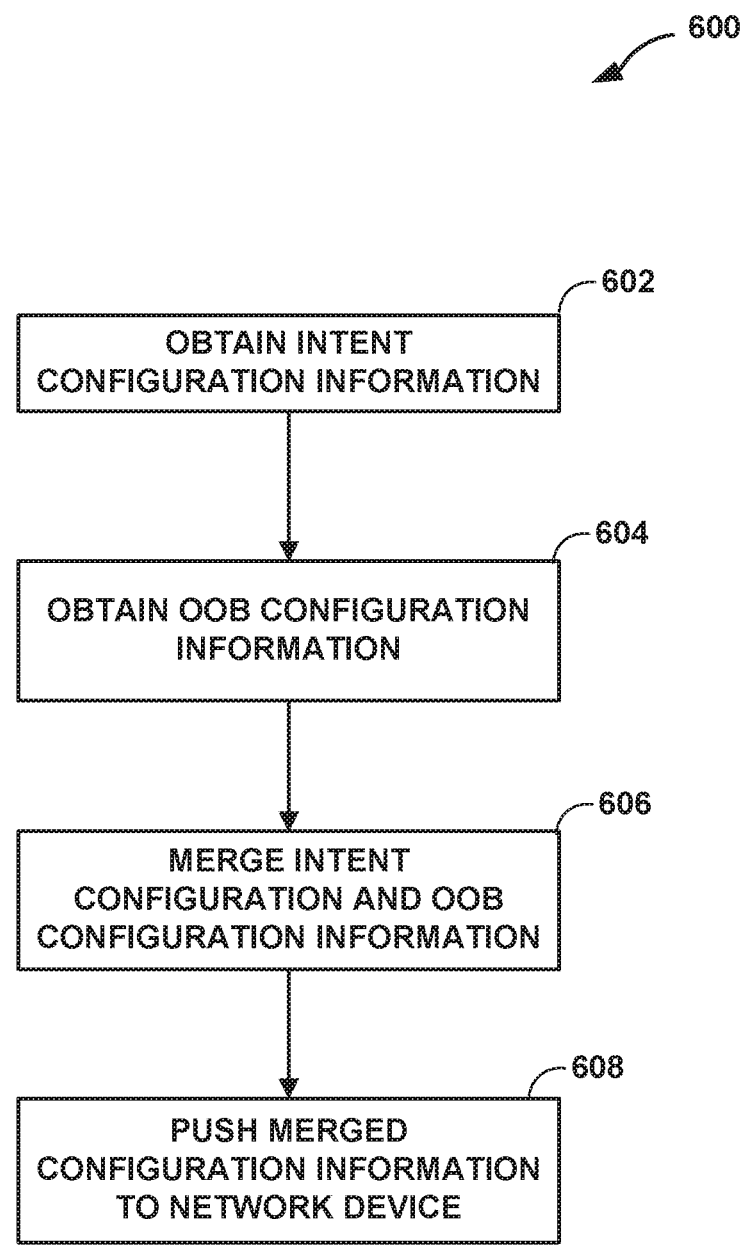
FIG. 6 is a flowchart illustrating an example method for restoring a network device according to techniques of this disclosure.

FIG. 6 is a flowchart illustrating another example method 600 for restoring a network device according to techniques of this disclosure. Method 600 of FIG. 6 may be performed by, e.g., controller device 10 of FIGS. 1 and 2. In one or more aspects, method 600 may be performed when a network or network device enters a bad state (e.g., when an OOB configuration change negatively impacts the functionality of the network or a network device) or when it is manually invoked (e.g., by administrator 12). As noted above, this disclosure refers to low-level device configuration produced from intents (i.e., produced by compiling or translating the intents) as "device-level intent configuration" or "intent configuration," to distinguish this device-level configuration from OOB device-level configuration.

Initially, controller device 10 obtains intent configuration information (e.g., the device-level intent configuration translated or compiled from one or more intents maintained by controller device 10) (602). For example, controller device 10 may obtain the device-level intent configuration translated or compiled from one or more intents maintained by controller device 10 from configuration database 40, which would not contain any OOB configuration changes. Next, controller device 10 may obtain backed up OOB configuration information (604). For example, controller device may obtain backed up OOB configuration changes and/or one or more incremental OOB configuration differences associated with a network device (e.g., from configuration database 40 of FIG. 2).

Controller device 10 may then merge the obtained intent configuration (e.g., the device-level intent configuration translated or compiled from one or more intents maintained by controller device 10) and obtained OOB configuration information (606). For example, controller device 10 may merge OOB configuration changes and/or one or more incremental OOB configuration differences associated with a network device to identify all of the OOB configuration changes that would need to be restored on the network device. As explained above, OOB configuration changes and/or incremental OOB configuration differences may be stores in XML files (e.g., XML DOMs), graph data models, log files, or any other format. In one or more aspects, merging the OOB configuration information includes consolidating nodes from two or more incremental OOB configuration differences or changes (e.g., consolidating the same node between two backups, the parent node from one backup with the child node from another backup, and/or the child node from one backup with the parent node from another back up). An example strategy for merging (or consolidating) the same node of two backups of incremental OOB configuration information is shown below (with operations for backed up incremental OOB configuration information $v_0$ represented in the columns and operations for backed up incremental OOB configuration information $v_1$ represented in the rows):

| $v_1/v_0$ | Add | Update | Delete |
|---|---|---|---|
| Add | N/A | N/A | N/A |
| Update | Allowed. Node state will be Add and Update the contents. | Allowed. Node operation will be Update and Update the contents in existing difference. | N/A |
| Delete | Allowed. Remove node entry from existing difference. | Allowed. Node operation will be Delete and Delete the contents from the existing difference. | N/A |

In the example above, when the same node is added in a first backup ($v_0$) and updated in the later backup ($v_1$), the result will be an updated add OOB operation (e.g., an add operation reflecting the updated contents). When the same node is updated in a first backup ($v_0$) and updated in the later backup ($v_1$), the result will be a merged update OOB operation (e.g., an up operation reflecting the consecutive updates). When the same node is deleted in the later backup ($v_1$), the result will be to remove the contents of the node previous (e.g., previous addition or update would be irrelevant because node is eventually removed). An example strategy for merging (or consolidating) a parent node of backed up incremental OOB configuration information $v_0$ (represented in the columns) with a child node of backed up OOB configuration information $v_1$ (represented in the rows) is shown below:

| $v_1/v_0$ | Add | Update | Delete |
|---|---|---|---|
| Add | Allowed. Node operation will be Add. Parent state will be Add. | Allowed. Node operation will be Add. Parent state will be Update. | N/A |
| Update | Allowed. Node state will be Add, and node operation will be Update. | Allowed. Node operation will be Update. Parent state will be Update. | N/A |
| Delete | Allowed. Remove node entry from existing difference. | Allowed. Node operation will be Delete. Parent state will be Update. | N/A |

An example strategy for merging (or consolidating) a child node of backed up incremental OOB configuration information $v_0$ (represented in the columns) with a parent node of backed up OOB configuration information $v_1$ (represented in the rows) shown below:

| $v_1/v_0$ | Add | Update | Delete |
|---|---|---|---|
| Add | N/A | N/A | N/A |
| Update | Allowed. Child state will be Add, and node operation will be Update. Delta would be merged. | Allowed. Child node operation will be Update. Node operation will be update and delta would be merged. | Allowed. Child node operation will be Delete. Node operation will be Update and delta would be merged. |
| Delete | Allowed. Remove Child node entry from existing difference. Node operation will be Delete. | Allowed. Remove Child node entry from existing difference. Node operation will be Delete. | N/A |

In the example above, when the parent node is deleted in a second backup ($v_1$), the result will be to remove the parent node and the child node—to avoid orphan child nodes. Once the OOB configuration changes are merged (or merged), the merged OOB configuration changes may be merged with the intent configuration information (e.g., controller device may apply the to avoid orphan child nodes. Once the OOB configuration changes are merged (or merged), the merged OOB configuration changes to the obtained device-level intent configuration translated or compiled from one or more intents).

Next, controller device 10 may push the merged configuration to the network device (e.g., configure the network device with the merged configuration information to restore the network device to a state that reflects not only the intent configuration but also any OOB configuration changes) (608). In this way, an administrator 12 need not manually reinstate previously made OOB configuration changes while ensuring running intent configurations are unaffected during a restore.

Figure 7:
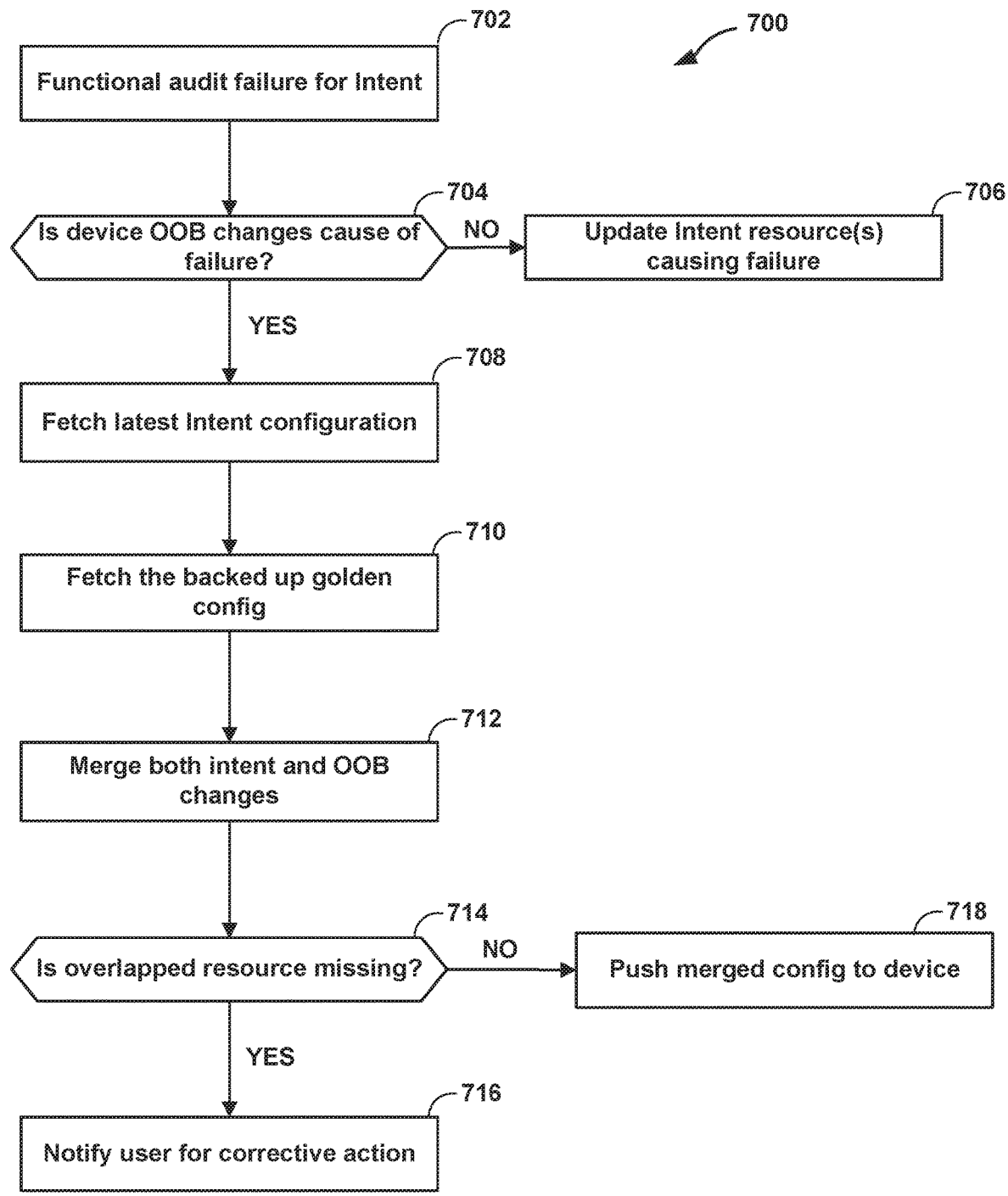
FIG. 7 is a flowchart illustrating another example method for restoring a network device according to techniques of this disclosure.

FIG. 7 is a flowchart illustrating another example method 700 for restoring a network device according to techniques of this disclosure. Method 700 of FIG. 7 may be performed by, e.g., controller device 10 of FIGS. 1 and 2.

Initially, a functional audit failure for an Intent occurs on a network device (702). In one or more aspects, controller 10 periodically performs an audit of the network devices it manages (e.g., at predetermined intervals of time and/or when new intents are translated into device-level intent configurations and pushed to one or more network devices). For example, a failure occurs when one intent impacts the functionality of another intent (e.g., when new intents are translated into device-level intent configurations and pushed to one or more network devices and the new device-level configurations have adverse effects on one or more previously deployed intents). In another example, a failure occurs when an OOB configuration change disrupts one or more previously deployed intents. In response to detecting the functional audit failure for an intent (702), controller 10 determines whether one or more OOB configuration changes to the network device caused the failure (704).

If one or more OOB configuration changes did not cause the failure ("NO" branch of 704) (e.g., when one or more intents impact the functionality of another intent), controller device 10 may determine the one or more Intent resources causing the failure and update those one or more resources (706). For example, controller device 10 may identify the one or more intents causing the failure and retranslate or recompile the one or more intents into device-level configurations and reconfigure the network device. In another example, controller device 10 may retranslate all intents into device-level configurations and reconfigure the network device. In other examples, controller 10 may take any other action to correct the failure.

If one or more OOB configurations did cause the failure ("YES" branch of 704), controller device 10 may fetch the latest Intent configuration (708). For example, controller device 10 may obtain the device-level intent configuration translated or compiled from one or more intents, maintained by controller device 10, from configuration database 40, which would not contain any OOB configuration changes. Next, controller device 10 may fetch the backed up "golden" configuration (e.g., the backed up OOB configuration changes) (710). Controller device 10 may then merge the intent configuration (e.g., the device-level intent configuration translated or compiled from one or more intents maintained by controller device 10) and OOB configuration changes (712). For example, controller device 10 may merge the intent configuration with the backed up OOB configuration changes by applying the backed up OOB configuration changes to the device-level intent configuration translated or compiled from one or more intents.

Next, controller device 10 may determine whether any overlapping resource is missing from the merged configuration (714). As described above, an overlapping resource is a resource that is used by both the intent configuration and the OOB configuration changes. For example, the overlapping resource may be an interface that was originally created based on an intent but was later directly modified by a user (e.g., administrator 12 manually added tagging to the interface). In some instances, controller device 10 may later replace the interface (e.g., due to performance degradation), which would cause OOB configuration changes (e.g., the tagging) to be lost. If an overlapping resource is missing ("YES" branch of 714), controller device 10 may notify the user (e.g., administrator 12) to take corrective action (e.g., enter new intent configuration, restore overlapping resource, etc.) (716). If an overlapping resource is not missing ("NO" branch of 714), controller device 10 may push the merged configuration to the network device to restore the network device to a state that reflects not only the intent configuration but also any OOB configuration changes (718) by configuring the network device with the merged configuration which restores the network into a working state.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

Various examples have been described. These and other examples are within the scope of the following claims.

What is claimed is:

1. A method comprising:
obtaining, by a controller device that manages a plurality of network devices, device-level configuration information from a network device of the plurality of network devices at a first time;
determining, by the controller device, one or more out-of-band (OOB) configuration changes between the device-level configuration information from the network device and previous device-level intent configuration information compiled from one or more intents maintained by the controller device to manage the plurality of network devices;
storing, by the controller device, the one or more OOB configuration changes associated with the network device;
determining, by the controller device, one or more configuration paths for the one or more OOB configurations changes;
determining, by the controller device, whether the one or more configuration paths are independent of the previous device-level intent configuration information compiled from the one or more intents; and
in response to determining that the one or more configuration paths are not independent of the previous device-level intent configuration information compiled from the one or more intents, storing, by the controller device, one or more overlapping resources for the one or more OOB configurations changes.

2. The method of claim 1, further comprising:
obtaining, by the controller device, second device-level configuration information from the network device of the plurality of network devices at a second time, after the first time;
determining, by the controller device, second one or more OOB configuration changes between the second device-level configuration information from the network device and the previous device-level intent configuration information;
determining, by the controller device, one or more incremental OOB configuration differences between the second one or more OOB configuration changes and the one or more OOB configuration changes; and
storing, by the controller device, the one or more incremental OOB configuration differences associated with the network device.

3. The method of claim 2, further comprising:
obtaining, by the controller device, third device-level configuration information from the network device of the plurality of network devices at a third time, after the second time;
determining, by the controller device, third one or more OOB configuration changes between the third device-level configuration information from the network device and the previous device-level intent configuration information;
determining, by the controller device, second one or more incremental OOB configuration differences between the third one or more OOB configuration changes and the second one or more OOB configuration changes; and
storing, by the controller device, the second one or more incremental OOB configuration differences associated with the network device.

4. The method of claim 3, wherein the first time, second time, and the third time are separated by the same duration of time.

5. The method of claim 3, wherein the one or more incremental OOB configuration differences is stored in a first Extensible Markup Language Document Object Model (XML DOM) and the second one or more incremental OOB configuration differences is stored in a second XML DOM, different than the first XML DOM.

6. The method of claim 1, further comprising:
storing, by the controller device, the previous device-level intent configuration information compiled from the one or more intents at a time before the first time.

7. The method of claim 6, wherein the previous device-level intent configuration information is stored separate from the one or more OOB configuration changes associated with the network device.

8. The method of claim 1, further comprising:
in response to detecting a functional audit failure, restoring, by the controller device, the network device, including:
obtaining, by the controller device, the previous device-level intent configuration information compiled from one or more intents;
obtaining, by the controller device, the one or more OOB configuration changes;
merging, by the controller device, the previous device-level intent configuration information with the one or more OOB configuration changes;
configuring, by the controller device, the network device with the merged configuration information.

9. The method of claim 1, further comprising:
comparing a first backed up configuration and a second backed up configuration, including merging one or more incremental OOB configuration changes in all backed up configuration versions after the first backed up configuration to the second backed up configuration.

10. The method of claim 1, further comprising:
obtaining, by the controller device, the previous device-level intent configuration information compiled from one or more intents;
obtaining, by the controller device, first one or more incremental OOB configuration differences and second one or more incremental OOB configuration differences;
merging, by the controller device, the previous device-level intent configuration information with OOB configuration information including the first one or more incremental OOB configuration differences and the second one or more incremental OOB configuration differences;
configuring, by the controller device, the network device with the merged configuration information.

11. The method of claim 10, wherein:
the one or more incremental OOB configuration differences is stored in a first XML DOM,
the second one or more incremental OOB configuration differences is stored in a second XML DOM, different than the first XML DOM, and
merging the one or more OOB configuration information with the second one or more OOB configuration changes includes consolidating a same node from a first XML DOM and from the second XML DOM.

12. The method of claim 10, wherein:
the one or more incremental OOB configuration differences is stored in a first XML DOM,
the second one or more incremental OOB configuration differences is stored in a second XML DOM, different than the first XML DOM, and
merging the OOB configuration information includes consolidating a parent node from the first XML DOM and a child node from the second XML DOM.

13. The method of claim 10, wherein
the one or more incremental OOB configuration differences is stored in a first XML DOM,
the second one or more incremental OOB configuration differences is stored in a second XML DOM, different than the first XML DOM, and
merging the OOB configuration information includes consolidating a parent node from the second XML DOM and a child node from the first XML DOM.

14. The method of claim 10, further comprising:
determining, by the controller device, one or more overlapping resources is missing from the merged configuration information; and
notifying, by the controller device in response to determining the overlapping resource is missing, a user of the network device for corrective action before configuring the network device with the merged configuration information.

15. The method of claim 10, wherein configuring the network device with the merged configuration information includes pushing, by the controller device, one or more overlapping resources to the network device.

16. The method of claim 15, wherein the one or more overlapping resources to the network device comprises one or more resources used by the previous device-level intent configuration information and the merged one or more OOB configuration changes.

17. A computer-readable storage medium having stored thereon instructions that, when executed, cause a processor of a controller device that manages a plurality of network devices to:
obtain device-level configuration information from a network device of the plurality of network devices at a first time;
determine one or more out-of-band (OOB) configuration changes between the device-level configuration information from the network device and the previous device-level intent configuration information compiled from one or more intents maintained by the controller device to manage the plurality of network devices;
store the one or more OOB configuration changes associated with the network device;
determine one or more configuration paths for the one or more OOB configurations changes;
determine whether the one or more configuration paths are independent of the previous device-level intent configuration information compiled from the one or more intents; and
in response to determining that the one or more configuration paths are not independent of the previous device-level intent configuration information compiled from the one or more intents, store one or more overlapping resources for the one or more OOB configurations changes.

18. A controller device that manages a plurality of network devices, the controller device comprising one or more processing units implemented in circuitry and configured to:
obtain device-level configuration information from a network device of the plurality of network devices at a first time;
determine one or more out-of-band (OOB) configuration changes between the device-level configuration information from the network device and the previous device-level intent configuration information compiled from one or more intents maintained by the controller device to manage the plurality of network devices;
store the one or more OOB configuration changes associated with the network device;
determine one or more configuration paths for the one or more OOB configurations changes;
determine whether the one or more configuration paths are independent of the previous device-level intent configuration information compiled from the one or more intents; and
in response to determining that the one or more configuration paths are not independent of the previous device-level intent configuration information compiled from the one or more intents, store one or more overlapping resources for the one or more OOB configurations changes.

* * * * *